US006869584B2

(12) United States Patent
Ying et al.

(10) Patent No.: US 6,869,584 B2
(45) Date of Patent: Mar. 22, 2005

(54) SYNTHESIS OF NANOMETER-SIZED PARTICLES BY REVERSE MICELLE MEDIATED TECHNIQUES

(75) Inventors: Jackie Y. Ying, Winchester, MA (US); Andrey Zarur, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/993,355

(22) Filed: Nov. 14, 2001

(65) Prior Publication Data

US 2002/0110519 A1 Aug. 15, 2002

Related U.S. Application Data

(63) Continuation of application No. 09/060,733, filed on Apr. 15, 1998, now Pat. No. 6,413,489.
(60) Provisional application No. 60/043,321, filed on Apr. 15, 1997.

(51) Int. Cl.$^7$ .......................... C01F 7/16; C04B 35/195; B01J 37/00; B01J 13/00
(52) U.S. Cl. .......................... 423/600; 516/22; 516/33; 501/12; 501/125; 502/132
(58) Field of Search ....................... 516/22, 33; 501/12, 501/125, 104, 108, 132; 423/600, 636; 502/104, 108, 132

(56) References Cited

U.S. PATENT DOCUMENTS

| | | |
|---|---|---|
| 4,107,288 A | 8/1978 | Oppenheim et al. ......... 424/489 |
| 4,359,537 A | 11/1982 | Chong .......................... 521/29 |
| 4,933,105 A | 6/1990 | Fong ........................... 424/462 |
| 4,933,404 A | 6/1990 | Beckman et al. ............ 526/207 |
| 4,960,737 A | 10/1990 | Guile et al. .................. 501/125 |
| 4,968,350 A | 11/1990 | Bindschaedler et al. ...................... 106/163.01 |
| 5,035,876 A | 7/1991 | Castellano .................. 423/608 |
| 5,059,574 A | 10/1991 | Abrevaya ................... 502/261 |
| 5,112,676 A | 5/1992 | Cot et al. .................... 423/593 |
| 5,147,841 A | 9/1992 | Wilcoxon .................... 516/33 |
| 5,196,177 A | 3/1993 | Watanabe et al. ........... 423/335 |
| 5,338,731 A | 8/1994 | Nakajima et al. ........... 514/772 |
| 5,376,347 A | 12/1994 | Ipponmatsu et al. ........ 423/338 |
| 5,540,981 A | 7/1996 | Gallagher et al. .......... 428/220 |
| 5,580,655 A | * 12/1996 | El-Shall et al. ............. 428/402 |
| 5,599,759 A | 2/1997 | Inagaki et al. ................ 502/80 |
| 5,622,684 A | 4/1997 | Pinnavaia et al. .......... 423/722 |
| 5,645,891 A | 7/1997 | Liu et al. ................. 427/376.2 |
| 5,662,824 A | 9/1997 | Sang et al. ............... 252/62.56 |
| 5,670,088 A | 9/1997 | Chittofrati et al. ............ 516/22 |
| 5,688,761 A | 11/1997 | Owen et al. ................... 514/2 |
| 5,695,901 A | 12/1997 | Selim ...................... 430/106.6 |
| 5,698,483 A | 12/1997 | Ong et al. ..................... 501/12 |
| 5,714,536 A | 2/1998 | Ziolo et al. .................. 524/430 |
| 5,725,802 A | 3/1998 | Chittofrati et al. ............ 516/22 |
| 5,731,261 A | 3/1998 | Balducci et al. ............. 502/439 |
| 5,770,172 A | 6/1998 | Linehan et al. ................ 516/22 |
| 5,837,025 A | 11/1998 | Auchter- Krummel et al. ............ 65/21.1 |
| 5,981,445 A | 11/1999 | Kirchnerova et al. ...... 423/21.1 |

FOREIGN PATENT DOCUMENTS

| | | | |
|---|---|---|---|
| EP | 0 370 939 B1 | | 5/1990 |
| JP | 3-69506 | | 3/1991 |
| JP | 06-239613 | * | 8/1994 |

OTHER PUBLICATIONS

Hawley's Condensed Chemical Dictionary, Eleventh Edition, edited by Sax and Lewis, Sr. (Van Nostrand Reinhold Company, Ney York, NY, copyright 1987), Oct.–1989, p. 1038.*

Machine translation of JP 06–239613, Japan Patent Office, http://www6.ipdl.jpo.go.jp/Tokujitu/PAJdetail.ipdl?N0000=60&N0120=01&N2001=2&N3001=H06–239613, date Jan. 2003.*

Zarur, Andrey J., et al., "Reverse microemulsion synthesis of nanostructured complex oxides for catalytic combustion," Department of Chemical Engineering, Massachusetts Institute of Technology, Cambridge, Massachusetts 02139–4307, USA, *Nature*, letters to nature, Jan. 6, 2000, pp. 65–67, vol. 403, www.nature.com, © 2000 MacMillan Magazines Ltd.

Zarur, Andrey J., et al., "Reverse Microemulsion–Mediated Synthesis and Structural Evolution of Barium Hexaaluminate Nanoparticles," Department of Chemical Engineering, Massachusetts Insitute of Technology, Cambridge, Massachusetts 02139–4307, Received Jun. 23, 1999. In Final Form: Sep. 8, 1999. *Langmuir* 2000, 16, pp. 3042–3049. 10.1021/la9908034 CCC:$19.00 © 2000 American Chemical Society, Published on Web Mar. 10, 2000.

Zarur. Andrey J., et al., "Phase Behavior, Structure, and Application of Reverse Microemulsions Stabilized by Nanionic Surfactants," Department of Chemcial Engineering, Massachusetts Institute of Technology, Cambridge, Massachusetts 02139–4307. Received Nov. 15, 1999. In Final Form: Jul. 7, 2000. *Langmuir* 2000, 16, pp. 9168–9176. 10.1021/la991488o CCC:$19.00 © 2000 American Chemical Society Published on Web Oct. 21, 2000.

M.A. Lopez–Quintela and J. Rivas, "Chemical Reactions in Microemulsions: A Powerful Method to Obtain Ultrafine Particles," *Journal of Colloid and Interface Science*, 1993, month unknown 158, pp. 446–451.

Database WPI on EAST, week 199817, London: Derwent Publications Ltd., AN 1991–129609, AClass E37, JP 03069506 A (RICOH KK), Abstract, 1991.

Database JPO on EAST, JP403069506A, Copyright 1991, 1991, month unknown.

* cited by examiner

*Primary Examiner*—Daniel S. Metzmaier
(74) *Attorney, Agent, or Firm*—Greenfield & Sacks, P.C.

(57) ABSTRACT

The present invention relates to a method of producing particles having a particle size of less than 100 nm and surface areas of at least 20 m$^2$/g where the particles are free from agglomeration. The method involves synthesizing the particles within an emulsion having a 1–40% water content to form reverse micelles. In particular, the particles formed are metal oxide particles. The particles can be used to oxidize hydrocarbons, particularly methane.

10 Claims, 8 Drawing Sheets

Fig. 1

|←25mm→|

SYNTHESIS OF NANOMETER-SIZED PARTICLES BY REVERSE MICELLE MEDIATED TECHNIQUES

RELATED APPLICATION

This application is a continuation of U.S. patent aplication Ser. No. 09/060,733, filed Apr. 15, 1998, now U.S. Pat. No. 6,413,489, which claims priority to U.S. provisional application Ser. No. 60/043,321, filed Apr. 15, 1997.

FIELD OF THE INVENTION

The present invention relates to a method of producing particles having a particle size of less than 100 nm and surface areas of at least 20 m$^2$/g where the particles are free from agglomeration. The method involves synthesizing the particles within an emulsion having a 1–40% water content to form reverse micelles. In particular, the particles formed are metal oxide particles.

BACKGROUND OF THE INVENTION

Nanometer-sized particles have a wide variety of applications including the areas of magnetic materials, heterogeneous catalysts, toner compositions, and ceramics. Typical techniques to synthesize these particles include sol-gel processing and emulsions.

Emulsions present a unique method to prepare nanometer-sized particles. Stable emulsions comprise a continuous phase and a discontinuous phase which are immiscible, where isolation of the discontinuous phase is accomplished by the use of surfactants. The discontinuous phase constitutes a substantially spherical regime which can potentially serve to control particle size. This phase is easily subjected to disruption, however, due to surface tension that exists between the immiscible phases. Thus, there exists a need for methods to obtain unique emulsion compositions that enhance stability of isolated phases and that yield particles having a desired size and morphology.

DISCUSSION OF RELATED ART

Metal oxide particles have previously been formed within micelles.

U.S. Pat. No. 5,725,802 relates to a process for the preparation of metal oxide particles. Water-in-oil microemulsions are formed in which the oil used is a perfluoropolyether, and metal ions in the aqueous phase are reacted with a gaseous or vapor reactant.

U.S. Pat. No. 5,670,088 relates to a method for forming mixed metal oxide particles. A microemulsions is used which includes a perfluoropolyether oil and a perfluoropolyether surfactant. The method further involves mixing one metal in an aqueous phase with a second metal in a perfluoropolyether oil phase. The addition of an alkali solution is accompanied by heating to form the desired oxide.

U.S. Pat. No. 5,695,901 relates to a method for producing nano-size magnetic iron oxide particles. An iron reactant is contained in a disperse phase, reacted with a basic reactant and subjected to a controlled oxidation by the addition of a oxygen-containing oxidant.

European Patent No. EP 0 370 939 relates to a process for producing ultrafine, magnetic neodymium-iron-boron particles. The particles are formed in an emulsion having a discontinuous aqueous phase, comprising an aqueous solution of neodymium-, iron- and boron-containing compounds, which is added to a continuous phase and an ionic surfactant to form an emulsion.

SUMMARY OF THE INVENTION

The present invention provides techniques for making very small particles of a variety of materials, small particles of material that can be made by the processing method, and methods of use of these particles.

One aspect of the invention provides a method for preparing a particle. The method involves providing an emulsion having a water content of about 1–40% and includes a hydrocarbon and at least one surfactant. The emulsion forms micelles which comprise a disperse aqueous phase. At least one reactant is added which reacts in and with the disperse aqueous phase to form a particle having a particle size of less than about 100 nm where the particle is free from agglomeration.

Another embodiment of the invention provides a method for preparing a particle from an emulsion having a water content of about 1–40% and includes a hydrocarbon and at least one non-ionic surfactant. The emulsion forms micelles which comprise a disperse aqueous phase. At least one reactant is added resulting in a particle having a particle size of less than about 100 nm where the particle is free from agglomeration.

Another aspect of the invention provides a method for coating a particle within a micelle. Preferred embodiments include coating the particle with a metal oxide layer.

In another aspect of the invention, a method is provided for drying an emulsion including nanometer-sized particles. The method includes the steps of forming an emulsion to prepare particles having a particle size of less than about 1 μm and exposing the emulsion to a supercritical fluid to dry the particles.

Another method of the invention involves forming an emulsion to prepare particles having a particle size of less than about 1 micron, and exposing the emulsion to a supercritical fluid to dry the particles.

In another embodiment a method is provided that involves effecting a reaction in the presence of a reverse emulsion, and producing a material from the reaction having a particle size of less than about 100 nm. The material retains a surface area of at least about 100 m$^2$/g when heated to 700° C.

In another embodiment a method is provided that involves oxidizing hydrocarbons in the presence of one or more metal oxides. The metal oxides have an average particle size of less than about 100 nm.

In another aspect the invention provides a series of compositions. In one embodiment a composition is provided that includes a material having an average particle size of less than about 100 nm. The material retains a surface area of at least about 100 m$^2$/g when heated to 700° C.

In another embodiment a composition is provided that includes a material capable of catalyzing a combustion reaction of a hydrocarbon. The material has a surface area, after exposure to conditions of at least about 1300° C. for at least about 2 hours, of at least 20 m$^2$/g.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

The present invention provides a series of methods and compositions involving high surface area particulate material. Small particle sizes are provided. In general, processes of the invention involve providing a nanoemulsion and synthesizing particles of material within micelles of the nanoemulsion. The nanoemulsion can be created as described in co-pending, commonly-owned U.S. patent application Ser. No. 08/739,509 of Ying, et al., incorporated herein by reference which also describes the use of a cosurfactant. In some cases, the nanoemulsion should be altered slightly relative to nanoemulsions described in the referenced application, as described below.

It is known in the art that small particles can be made within the isolated phase of an emulsion. An "emulsion" is a stable mixture of at least two immiscible liquids. In general, immiscible liquids tend to separate into two distinct phases. An emulsion is thus stabilized by the addition of a "surfactant" which functions to reduce surface tension between the at least two immiscible liquids. The emulsions of the present invention comprise two immiscible liquids, in particular water and oil. Emulsions comprise a continuous phase and a disperse phase. The disperse phase is the isolated phase stabilized by a surfactant. The present invention involves, in particular, water-in-oil (w/o) emulsions having a disperse aqueous phase and a hydrocarbon continuous phase. Alternatively, the isolated disperse aqueous phase is referred to as a "reverse micelle."

In typical prior art techniques, the water concentration of the emulsion is quite low and/or the disperse phase of the emulsion includes reverse micelles of relatively large size. The present invention provides a water-in-oil emulsion having a high aqueous concentration, small micelle size, and involves formation of particulate material within the disperse aqueous phase. By using these desired surfactants and reaction conditions, the methods of the present invention provide results that are surprisingly advantageous since those of ordinary skill in the art would expect that at a high aqueous concentration and small disperse phase size, as described herein, disruption of micelles i.e., emulsion disruption, would occur leading to agglomeration and particle growth. The present invention provides stable emulsions and constant micelle size during reaction. Through control of the micelle size and stability, it follows that the methods of the present invention allow control of the size, morphology and polydispersity of the resulting particles.

One aspect of the invention provides a method for preparing particles within reverse micelles having a disperse aqueous phase. The method involves forming an emulsion including a water content of between about 1–40%, preferably between about 5–25%, and more preferably still between about 10–15%. In another embodiment, the emulsion has a water content of at least about 20%, more preferably at least about 30%, more preferably at least about 40%, and more preferably still at least about 50%.

It is an advantage of the present invention that the particles described here have a continuous structure, "continuous structure" defined as comprising essentially one outer surface and are distinguished from agglomerates of nanometer-sized particles. Many prior art methods produce such agglomerates from emulsions, the agglomerates comprising a cluster of nanometer-sized particles resulting in several outer surfaces. The present method yields particles free from such agglomeration because a substantial portion of the micelles produces one particle per micelle. The resulting high surface areas are attributed to a plurality of inner surfaces within the particles which arise from a myriad of channels and pores penetrating the particles. The continuous structure can either comprise a crystalline structure or an amorphous structure.

The emulsion is a water in oil emulsion in which the oil functions as the continuous phase. Preferably the oil is a hydrocarbon where "hydrocarbon" is defined as having a formula $C_xH_yO_z$, x and y being the same or different, both x and y are integers greater than or equal to one and z can be an integer greater than or equal to zero. In a preferred embodiment, the hydrocarbon can be any saturated or unsaturated carbonaceous species with a carbon number >5, substituted or unsubstituted, linear or branched. It can be aliphatic or aromatic.

A surfactant is included in the emulsion to stabilize the reverse micelles. The surfactant can be an ionic surfactant or a non-ionic surfactant. A surfactant typically has a main hydrocarbon chain wherein one end of the chain is soluble in one of the immiscible liquids of the emulsion and the other end is soluble in the other immiscible liquid. Thus a structure of the micelle includes the disperse aqueous phase contained by a surfactant "film" which isolates and stabilizes the aqueous phase from the hydrocarbon continuous phase. In one embodiment, the surfactant is an "ionic surfactant" in which the chain has a charge balanced by a counterion. Preferred ionic surfactants include SDS, and sodium AOT. In another embodiment, the surfactant is a "non-ionic surfactant" which possesses a neutral charge. Preferred non-ionic surfactants include polyethoxylated alcohols, polyethoxylated phenols, oleates, etc.

The reverse micelles formed by methods of the present invention have a mean diameter in the nanometer range. Preferably, the reverse micelles have a mean diameter of less than about 20 nanometers, preferably less than about 15 nanometers, more preferable less than about 10 nanometers, and more preferable still less than about 5 nanometers. The reverse micelles are stable in that they are not easily disrupted in the course of metal oxide particle growth. Disruption occurs when the surfactant film is broken, causing the particle to enter the continuous phase and possibly resulting in loss of dispersity and desired morphology. Thus the preferred combination of hydrocarbon, surfactant and water content stabilizes reverse micelles that allow the formation of particles having desired attributes.

The particles are formed within the reverse micelles. Other prior art methods involve the formation of the particles outside of the micelle. It is believed that the method of the present invention achieves control of desired particle size and morphology. The method is facilitated by providing a surfactant system for the nanoemulsion that allows for introduction of a reactant from the continuous phase to the disperse phase without disruption of the disperse phase (e.g., disruption of the micelles) even at the high aqueous content of the formulations of the invention. This can be achieved in accordance with the teachings of the above-referenced application Ser. No. 08/739,509 of Ying while, in some cases, altering the surfactant system to increase the overall surfactant concentration while optionally decreasing the ratio overall of cosurfactant to surfactant. A simple screening test can be used to determine a suitable surfactant system. The screening test involves providing an aqueous phase including reactant and/or carrier, if auxiliary carrier is used to transport the reactant from the continuous phase to the disperse phase, providing disperse phase fluid including the reactant or carrier concentration suitable for carrying out the reaction, and forming aqueous-in-nonaqueous emulsions and determining the stability of these emulsions.

The method allows particle formation within the reverse micelle through chosen parameters such as methods of introducing a reactant to the emulsion and particular reactants used. The reactant can be a fluid that is miscible with the continuous phase of the nanoemulsion, or a reactant carried in a fluid carrier that is miscible with the continuous phase. The reactant can react at the aqueous phase by reacting with the aqueous phase (e.g., reacting with water as in a hydrolysis reaction) or the reactant can be a first reactant that reacts with a second reactant dissolved or suspended within the aqueous phase.

The particles formed by the method of the present invention can be organic or inorganic. Inorganic particles include metals, metal alloys, metal oxides and mixed metal oxides, metal sulfides, metal nitrides, metal halides, metal arsenides, and the like. Organic particles include polymers such as polysaccharides, phospholipides, polylipids, co-polymers, hydrogels, and the like.

In one embodiment, the invention provides a method for preparing a metal oxide particle. The metal can be selected from the group consisting of alkaline metals, alkaline earth metals, transition metals and rare earth metals. Preferably, the metal oxide is an oxide of a metal from group IA, or IIA, such as magnesia, calcia, or baria, or from group IIIA or an oxide of a transition metal such as titania, manganese oxide, yttria, zirconia, lanthana, and the like. Also, oxides of metalloids or of semimetals are included as are oxides of lanthanides such as ceria, samaria, and the like. Also, oxides of actinides, and combinations of the above, i.e., complex metal oxides, are included. Complex metal oxides can include perovskites such as La—Sr—Fe—Co oxide. Complex metal oxides also can include aluminates such as barium hexaaluminate or strontium hexaaluminate. Also, titanates such strontium titinate, and also silicates. As mentioned, the metal oxide can be a mixed metal oxide comprising at least two different metals.

Particles of the invention (material) can be defined by at least one metal oxide doped with at least one metal oxide. Examples include doped barium aluminates in which the dopant is a transition metal oxide such as Ni, Mn, La, Co, Fe, Cu, Y, or the like. Another example of a dopant is a lanthanide or actinide such as Ce, Gd, Pr, or the like.

In another embodiment the particles of the invention (material) are at least one metal oxide supported on at least one different metal oxide. In one embodiment the support is barium hexaaluminate. Other supports include titania, magnesia, and the like. The supported material can be, for example, cerium oxide, La/Ce oxides, Cu/Ce oxides, barium oxide, nickel oxide, manganese oxide, cobalt oxide, vanadia, or the like.

The material of the invention can also be supported on a monolith. A monolith, as would be known to those of ordinary skill in the art, is a continuous solid having macropores of at least 1 micrometer in size.

Prior art methods of synthesizing metal oxides in aqueous solutions typically rely on a reaction rate of a metal reactant with water. These methods presents difficulties in controlling particle morphology especially when preparing mixed metal oxides or other complex metal oxides because a first and second metal reactant may have very different reaction rates with water. The method of the present invention allows control of mixed metal oxide morphology because the various metal reactants can be dissolved within the continuous phase, the aqueous phase or the fluid carrier. Thus reaction rates are determined by diffusion into the reverse micelle, and for metal reactants in general, these reaction rates are relatively equal.

In another embodiment, the metal reactant may react with aqueous phase after controlling the pH of the aqueous phase. Control of pH can be accomplished by the addition of a suitable acid or base in desired amounts. Suitable acids include: organic or inorganic acids. Inorganic acids include sulfuric acid, nitric acid, hydrochloric acid, phosphoric acid, carbonic acid, aqueous hydrogen bromide and iodide. Organic acids include: acetic acid, any carboxylic acid.

Because conditions of pH, temperature, reactant concentration, and the like will be adjusted for a particular reaction that is to take place within the disperse phase of the nanoemulsion, in some cases, the surfactant system should be tailored so as to preserve the emulsion under these conditions. The above-described screening test can be used for tailoring the surfactant system for particular reaction conditions.

The rate of addition of reactant to the emulsion system should be low enough that an unacceptable local over-concentration of reactant does not result. The rate should be low enough that the emulsion is not disrupted. The control of the addition is done empirically. The precursor mixture can be contained in solution within a carrier or the continuous phase in an air-free flask (it can also be done in a normal atmosphere). The solution is then "pushed-out" through a cannula with argon, nitrogen or other gas, into the reverse emulsion which is vigorously stirred. Typical addition rates are in the order of 1 ml/min for 100 ml emulsion volumes.

The carrier used to carry a reactant from the continuous phase to the disperse phase, where a carrier is necessary, can be selected among, for example, for inorganic reactions alcohols with typically less than about 5 carbons of any configurations such as linear or branched hydrocarbons (these include, for example, neopentanol, butanols, propanols, ethanol, etc.); for organic reactions: organic solvents such as heptane, hexane, toluene, benzene, cyclohexane, etc.

In one embodiment the reactant is a ceramic precursor dissolved in a carrier solvent that is miscible with the continuous phase of the nanoemulsion. The ceramic precursor can be miscible with the continuous phase of the nanoemulsion. In another embodiment, the ceramic precursor is introduced into the disperse phase of the reverse emulsion prior to reaction.

In another embodiment, a ceramic precursor in a non-aqueous emulsion is introduced into the aqueous reverse emulsion. The emulsified ceramic precursor can be miscible with the continuous phase of the nanoemulsion. In yet another embodiment, the method involves introducing a ceramic precursor into the disperse phase prior to formation of the emulsion. In a preferred embodiment, the ceramic precursor defined is an alkoxide precursor such as barium and aluminum alkoxide. A water/precursor molar ratio can be about 1:500, preferably about 20:300 and more preferably about 50:100. Accordingly, these embodiments can be used when the reactant is a base or an acid.

In another embodiment, the reactant ceramic precursor can be precipitated by introducing a reactant which is miscible with the continuous phase of the reverse emulsion. The ceramic precursor can also be precipitated by introducing a reactant which is emulsified in a solvent which is miscible with the continuous phase of the reverse emulsion. The reactant can also be a base or an acid.

In one set of embodiments the reactant is a second emulsion. For example, first and second water-in-oil emulsions are provided in which a first reactant is provided in the aqueous phase of the first emulsion and a second reactant, which reacts with the first reactant, is provided in the aqueous phase of the second emulsion. These can be first and second reactants dissolved or suspended in the respective aqueous phases. The emulsions are mixed and, since emulsions of these types are dynamic and fluid/fluid exchange occurs in a normal, dynamic manner between the discontinuous, aqueous phases, the fluid/fluid exchange leads to a reaction. As one example of this embodiment, one emulsion can be provided in which the aqueous phase contains barium nitrate and aluminum nitrate, and the other emulsion contains an aqueous phase in which is dissolved ammonium hydroxide. Mixture of these two emulsions results in the production of barium and aluminum hydroxides, and oxides, with particle size and/or surface area as described above.

Reactions described in these embodiments can be promoted by an energy source selected from the group consisting of a microwave radiation source, a laser, an ultraviolet radiation source, an electric field, a magnetic field, and an electromagnetic field.

Products generated via precipitation or chemical reaction in the aqueous phase of nanoemulsions having an aqueous concentration of at least 5% can be used in suspension, or recovered. Recovery can involve providing the particles reacted in the emulsion, and then freeze-drying the particles. The freeze-dried particles can then be supercritically dried. Remaining surfactant and other organics can be removed by displacement with a fluid such as isoproponal and then supercritically drying the particles, or oven drying the particles. Alternatively, the particles and auxiliary surfactant and other organics can be oven-dried or supercritically-dried, without freeze drying. The recovery method can involve inducing phase separation of the reverse emulsion by cooling or heating.

In another embodiment, the materials are recovered after an aging period, preferably between 1 h and 7 days. When the reaction includes a barium-aluminum reaction mixture a preferable aging time is between about 1 h to 3 days before recovery, more preferably between about 12 to 72 h, and more preferably still between about 24 to 48 h.

In another embodiment, the reacted particles in the nanoemulsion can be supercritically dried by exchanging existing fluids with a fluid such as isoproponal, then supercritically drying the resultant suspension.

Supercritical drying can involve exposing the system to conditions at which the fluid carrier is a supercritical fluid, and venting the supercritical fluid above its critical temperature. Freeze-drying can involve spraying the emulsion, through a nozzle or atomizer, into liquid nitrogen to create finely-divided frozen particles of the emulsion, and then evacuating the particles at a temperature low enough that sublimation of the carrier and other fluids occurs. Where the materials are a product of barium-aluminum precursor reactions, spray-freezing is a preferable method for particle recovery.

The method can further include removing remaining organic materials by a process selected from the group consisting of heat treatment, solvent extraction and rotoevaporation.

Figure 1:
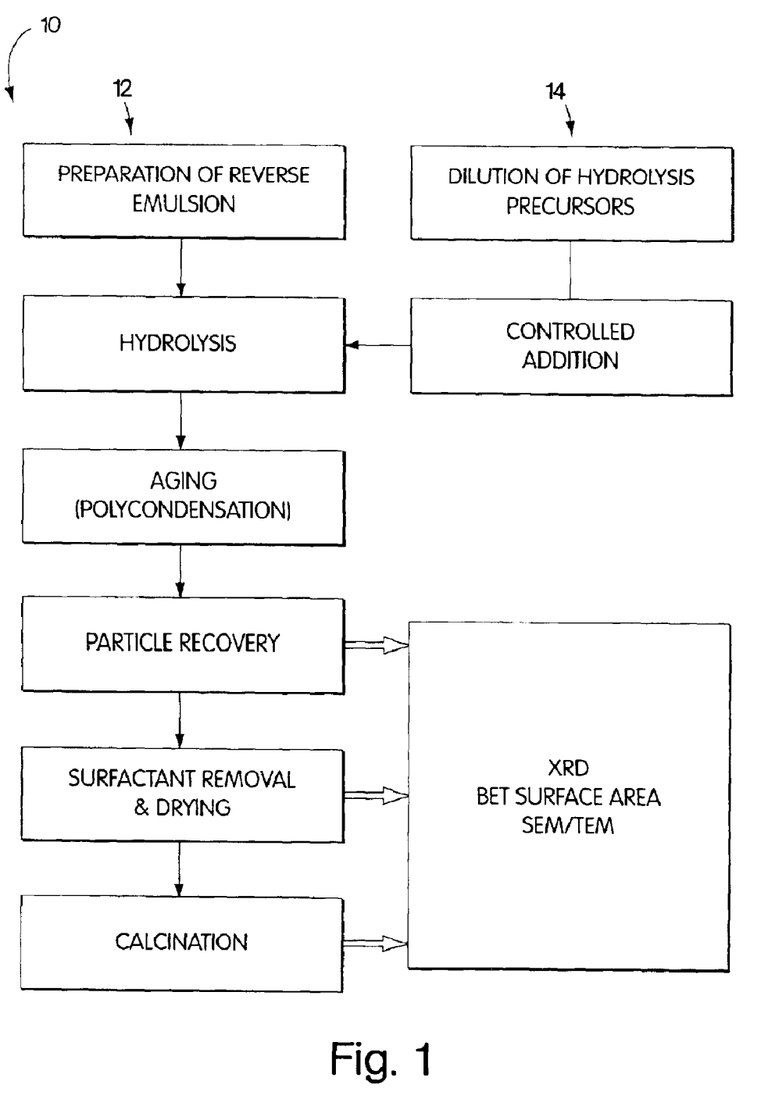
FIG. 1 depicts a process flowchart outlining the steps for forming an emulsion and synthesizing a particle from the emulsion.

FIG. 1 shows a flowchart 10 describing the generalized synthesis procedure. A water-in-oil reverse emulsion 12 is prepared by mixing a surfactant/cosurfactant combination, a hydrocarbon phase, and an aqueous phase. The order of addition does not affect the final state of the emulsion, although undesired metastable gel-like phases may be obtained as intermediate products. To avoid the undesired product formation, the surfactant is first dissolved in the hydrocarbon phase. The water and cosurfactant are then added alternatively. The resulting emulsion is a continuous transparent liquid. This system is composed of monodisperse water droplets of nanometer size suspended in a continuous hydrocarbon phase, each droplet surrounded by a surfactant interface. Previous research describes a methodology to obtain reverse micellar solutions using a variety of hydrocarbon systems. The organic phase can be a pure hydrocarbon, such as iso-octane, or a complex mixture, such as kerosene or diesel. The main surfactant is usually a complex mixture of polyethoxylated alcohols. The cosurfactant is either a linear alcohol such as hexanol or heptanol, or a mixture of linear alcohols and polymeric surfactants such as polyethylene glycol alkylates. The final particle size of the water particles depends on the nature of the hydrocarbon used as well as on the characteristics of the surfactant/cosurfactant system.

Once the water-in-oil emulsion is created, step 14 in FIG. 1 involves dissolving the hydrolysis precursors in a suitable medium that will not cause phase separation of the emulsion. Examples of the suitable medium are isopropanol, butanol or pentanol. The precursors for ceramic applications are usually alkoxides of base metals or transition metals, such as iso-propoxides or sec-butoxides. The precursor solution is then slowly added to the nanoemulsion. The precursors diffuse to the micelle interface where they come in contact with water, initiating the hydrolysis reaction. The diffusion rate of precursors to the hydrolyzing media can be controlled by manipulating the agitation rate, as well as the steric configuration of the precursors. A transparent clear solution is obtained after addition, indicating that the precipitated particles obtained from the hydrolysis are in the nanometer range and do not scatter light. The inverted micellar compartments act as microreactors where the hydrolysis reaction is conducted. We believe that reaction products remain contained within the reversed micellar compartments throughout the hydrolysis and condensation processes. In this way, the particle size of the hydrolysis products, as well as their geometry, can be controlled by manipulating the particle size and morphology of the micelles in the emulsion, and the aging conditions. Through aging, a variety of particle diameters can be obtained, ranging from tens to several hundred nanometers. The final particle size and morphology will depend on parameters such as the agitation rate, the temperature during growth, and the aging time. The products can be separated and treated afterwards by a variety of techniques, depending on the desired application.

According to another aspect, the invention provides a method of making a high-surface-area and/or small-particle-size material. "Particle size" is defined as a mean diameter of a particle. The method results in particles of material, reacted at the aqueous phase, having a particle size of less than about 100 nm in preferred embodiments, more preferably less than about 50 nm, more preferably less than about 20 nm, more preferably less than about 10 nm, and more preferably still less than about 5 nm. The surface area of the material is preferably at least about 20 $m^2/g$, more preferably at least about 50 $m^2/g$, more preferably at least about 75 $m^2/g$, more preferably at least about 100 $m^2/g$, more preferably at least about 150 $m^2/g$, and more preferably at least about 200 $m^2/g$. In another set of embodiments even higher surface area materials are produced, for example those of at least about 300, 400, 500, 600, 700, 800, 900, or even 1000 $m^2/g$. The material of the invention is particularly robust and, as mentioned, is defined by highly-divided, non-agglomerated, high surface area material. The material preferably retains the surface area defined above even when stored at room temperature for a considerable period of time or when heated to higher temperatures. In particular, the material maintains the above-noted surface areas when heated to 500° C., 700° C., 900° C., 1100° C. or even 1300° C. for periods of time for at least about 10 minutes, preferably 30 minutes, more preferably 1 h, or more preferably still at least about 2 h.

It is noted that one set of embodiments includes all combinations of all of the above-noted surface areas, particle sizes, and retention of surface area at the variety of temperatures mentioned.

According to one aspect the invention provides a series of low-particle-size and/or high-surface-area particulate material. Preferably the particles have a size of less than about 100 nm, or other preferred average particle sizes described above, and/or have a surface area of at least about 20 $m^2/g$, or any of other preferred surface areas described above.

The material that is capable of synthesis or precipitation in aqueous conditions includes any inorganic or organic material capable of undergoing a hydrolysis reaction in aqueous conditions, a precipitation reaction, a polymerization reaction, or the like. These reactions are well-known to those of ordinary skill in the art. For example, polymerization can be effected by chemical initiation or by, for example, exposure to electromagnetic radiation such as UV light. Hydrolysis can be followed by polymerization, polycondensation, coupling, or the like. Based upon the teachings in the instant disclosure, those of ordinary skill in the art can select a wide range of materials capable of synthesis or precipitation in aqueous conditions.

In one set of embodiments, the material that is capable of synthesis or precipitation in aqueous condition is a material capable of participating in a catalytic combustion reaction, e.g., for ultra-lean combustion. These types of materials, at high combustion temperatures, can operate at low fuel concentration and can reduce emissions of pollutants such as $NO_x$. But at temperatures high enough for this type of combustion, typical prior art materials undergo unacceptable vaporization, sintering, or other degradation. In one embodiment, the material of the present invention that is capable of synthesis or precipitation in aqueous conditions includes Group IIA oxides or hexaluminates (such as $BaO.6Al_2O_3$) optionally including dopants typically used in catalytic combustion reactions such as transition metals, metalloids, complexes of these materials, transition metal oxides, actinides, lanthanides, oxides of these, Group IA elements, or combinations thereof.

In one set of preferred embodiments the material of the invention is stable at a temperature of at least 500° C. for at least 2 hours with loss in surface area of the material of less than about 10%. In another set of preferred embodiments the material of the invention is stable, after being heated at a temperature of at least 500° C. for at least 30 minutes, for at least two additional hours with a loss in surface area of the material of less than about 10% during that two hours. In a set of more preferred embodiments this maximum loss in surface area occurs when the material is heated at a temperature of at least about 750° C., preferably at least about 1000° C., more preferably at least about 1100° C., more preferably at least about 1300° C., and more preferably still at least about 1500° C. for a period of time for at least about 2 hours, preferably at least about 8 hours, more preferably at least about 12 hours, and more preferably still at least about 24 hours. Any combination of these parameters can define one embodiment. For example, in one embodiment the material is stable at a temperature of at least about 1300° C. for a period of time of at least about 8 hours with a loss in surface area of less than about 10%.

This material can be any of the above-described materials such as metal oxides, Group IIA hexaluminates or oxides, any combinations of these materials optionally doped, and the like.

The particles produced in accordance with the invention have a variety of uses. In one embodiment the particles are used as drug-delivery carriers since very small organic particles (e.g., polymeric particles) can be created encapsulating a therapeutic agent. For example, a therapeutic agent can be provided in the aqueous phase of the nanoemulsion and a reactant introduced into the continuous phase, optionally via a carrier miscible with the continuous phase, and allowed to react at the aqueous/nonaqueous interface to form an organic (optionally polymeric) shell encapsulating the therapeutic agent. These nano-sized particles can be used as drug-delivery agents.

In another set of embodiments, nano-scale particles can be provided for use in micro or nanochromatography. For example, very small solid-phase chromatography beads can be prepared in accordance with the teachings of the invention, a suspension of the beads can be flowed through a capillary tube, and carrier can be driven off by heat.

The invention also provides a technique for controlling the length of polymer chains in a polymer reaction by confining the space within which the reaction can occur. The confined space is defined by the microreactors that are the aqueous micelles of the nanoemulsion. When a polymeric precursor is provided in the aqueous phase and a reactant added to the discontinuous phase which is allowed to interact within the aqueous phase and cause polymerization, because of the size of the aqueous micelles, polymer chain size is limited. Additionally, nanometer-sized polymer particles can be made.

Another aspect of the invention provides a method for oxidizing hydrocarbons. The oxidation is performed in the presence of one or more non-noble metal oxides with particle size of less than about 100 nm, preferably less than about 50 nm, more preferably less than about 25 nm, more preferably less than about 10 nm, and more preferably still less than about 5 nm. The hydrocarbon can be selected from the group consisting of methane, ethane, propane and butane. A preferable oxidation temperature is between about 400° C. to about 1300° C.

The invention provides a hydrocarbon conversion of at least about 10% at about 400° C., preferably at least about 10% at about 350° C., more preferably at least about 90% at about 600° C., and more preferably still at least about 90% at about 500° C. In another embodiment, at least about 90% of the initial catalytic conversion is sustained at 1100° C. for at least about 2 h, preferably for at least about 12 h, and more preferably for at least about 1 month. In another embodiment, at least about 90% of the initial catalytic conversion is sustained at 1300° C. for at least about 2 h, preferably for at least about 12 h, and more preferably for at least about 1 month.

In another embodiment the hydrocarbon catalysis occurs in the presence of water or water vapor. Preferably the catalysis occurs at 1300 ° C. in 8% volume water.

In all aspects of the invention, the particles can be any of the described preferred particles in any of the described particle size or surface area ranges or combinations of particle size and surface area. The methods of making compounds can be used, and preferably are used, in combination with preferred sizes and surface areas of the particles as described herein.

The function and advantage of these and other embodiments of the present invention will be more fully understood from the examples below. The following examples are intended to illustrate the benefits of the present invention, but do not exemplify the full scope of the invention.

EXAMPLE 1

Preparation of the Reverse Nano-emulsion

Water-in-oil nanoemulsions were prepared by mixing 2,2,4 trimethylpentane (Aldrich Chemical Co. Inc., 99.8+% pure) and de-ionized water with a commercial polyethoxylated alcohol surfactant, Neodol 91-6 (Shell Chemical Co.), as main surfactant, and 1-pentanol (Aldrich Chemical Co. Inc., 99+% pure) as cosurfactant. The emulsions were stirred vigorously until a clear solution was obtained. Emulsions containing 1, 5, 10, 30 and 40 wt % water were prepared. Table 1 shows the amounts of surfactant and cosurfactant required to prepare these emulsions.

Addition of acetic acid (Aldrich Chemical Co. Inc., 99.8% pure) or ammonium hydroxide (Aldrich Chemical Co. Inc., 99.9% pure, 30% in water) to the water used to form the emulsion, was used to control the pH of the hydrolyzing media. The acid or hydroxide was dissolved in the deionized water prior to the mixing with the organic and surfactant phases. Emulsions containing water phases of pH 2, 4, 7, 10, and 12 were used for these experiments. Table 1 shows the variation of the overall amount of surfactant required to stabilize microemulsions with varying the pH of the aqueous phase.

Introduction of dopants into the barium hexaaluminate structure can be desirable in order to improve its catalytic combustion properties. Transition metal dopants such as manganese and nickel have been proven to increase the catalytic activity of barium hexaaluminate at low temperatures. In order to effectively increase the catalytic activity, these cations are incorporated into the lattice structure, substituting an aluminum atom in the crystal. Nickel salts, such as nickel nitrate can be dissolved in the water used to prepare the emulsions, in an attempt to obtain a doped barium hexaaluminate through this method.

EXAMPLE 2

Preparation of the Mixed Ba—Al Alkoxide Solution

2-Propanol (Malinckrodt Chem. Co., 99+% pure) was degassed and dried by argon (BOC Gases, Grade 5.0) exchange. 1 g of metallic barium (Aldrich Chem. Co. Inc., 99+% pure) was mechanically milled and placed in a 1000 ml dried flask. As an alternative to mechanical milling, the barium can be reacted as a pellet, ingot, wire or the like. 250 ml of dried 2-propanol was transferred to the flask under argon and refluxed at 110° C. for 24 h. 9.6 g of aluminum isopropoxide (Aldrich Chem. Co. Inc., 98+% pure) were added to the barium isopropoxide solution and refluxed for 24 additional hours. The combined barium/aluminum precursor concentration was 5.42 wt %. No solid residues were observed after refluxing. Some of the resulting precursors solutions were further dissolved in dried 2-propanol in 1:2 and 1:4 ratios, yielding final precursors concentrations of 2.71 wt % and 1.35 wt % respectively.

We found that concentration of the precursors can affect the way the reaction is carried out. When the precursor is introduced at medium and high concentrations, the microemulsions typically will undergo phase separation, regardless of the water concentration and reaction temperature. At the high concentrations, the resulting gels may be no different than those prepared through regular sol-gel processing in terms of surface area and thermal stability. At medium concentrations an increase of the surface area of the dried gels is observed over regular sol-gel materials. However, after calcination at 1350° C., the surface areas are practically identical for both systems. Materials prepared at low precursor concentration yield the highest surface areas for both the dried gels and calcined materials.

Figure 2:
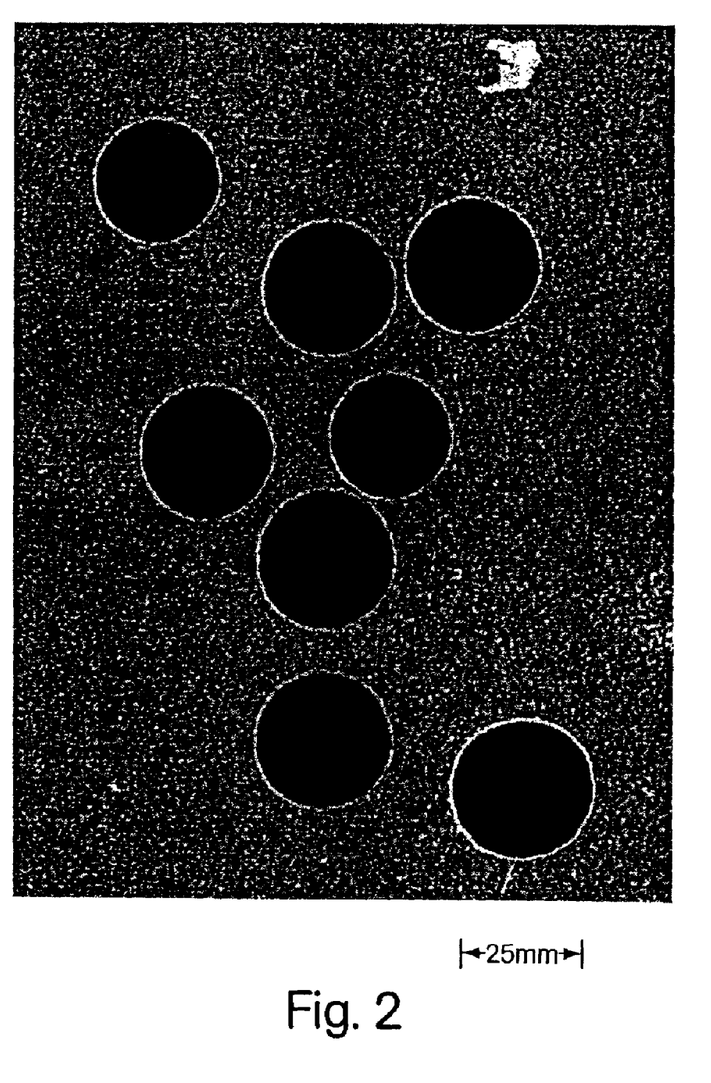
FIG. 2 shows a transmission electron micrograph (TEM) of Ba—Al oxide microspheres prepared from a 5 wt % water emulsion.

At low precursor concentrations, the emulsion is maintained, and throughout the hydrolysis process, the solution remains clear. TEM analysis of the reaction mixture prepared using dilute precursor solutions revealed a uniform particle size distribution and virtually no agglomeration. FIG. 2 shows a TEM of the microspheres prepared from a 5 wt % water emulsion using dilute precursor solution. At low precursor concentration hydrolysis and condensation are limited to the water droplets in the microemulsion. This regulates the growth of the nanoparticles uniformly within the nanometer-sized inverted micellar compartment.

Figure 3A:
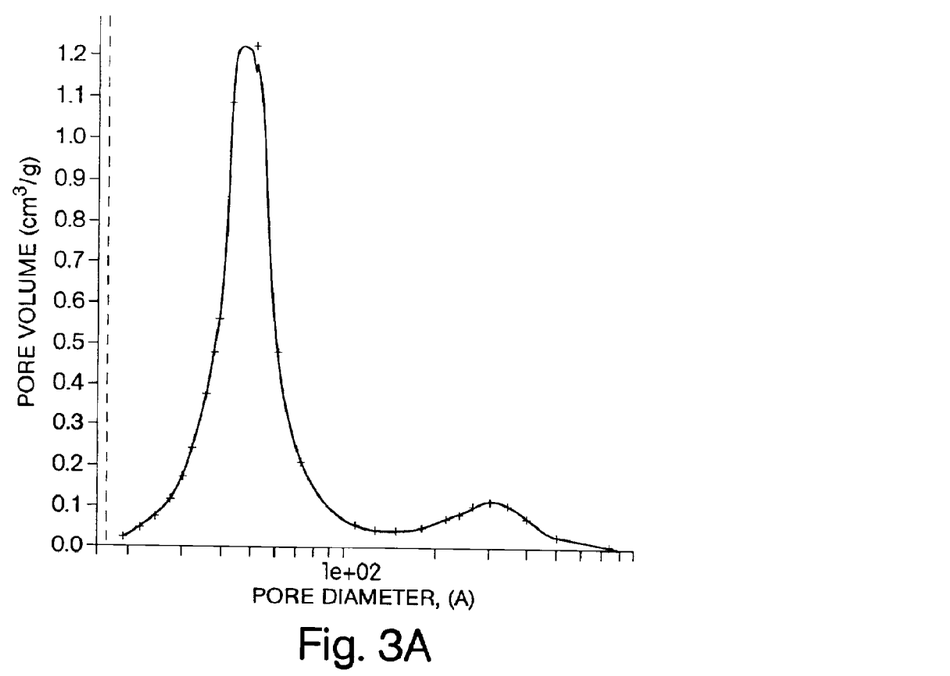
FIG. 3(a) shows a typical isotherm and (b) shows a desorption pore size distribution.
Figure 3B:
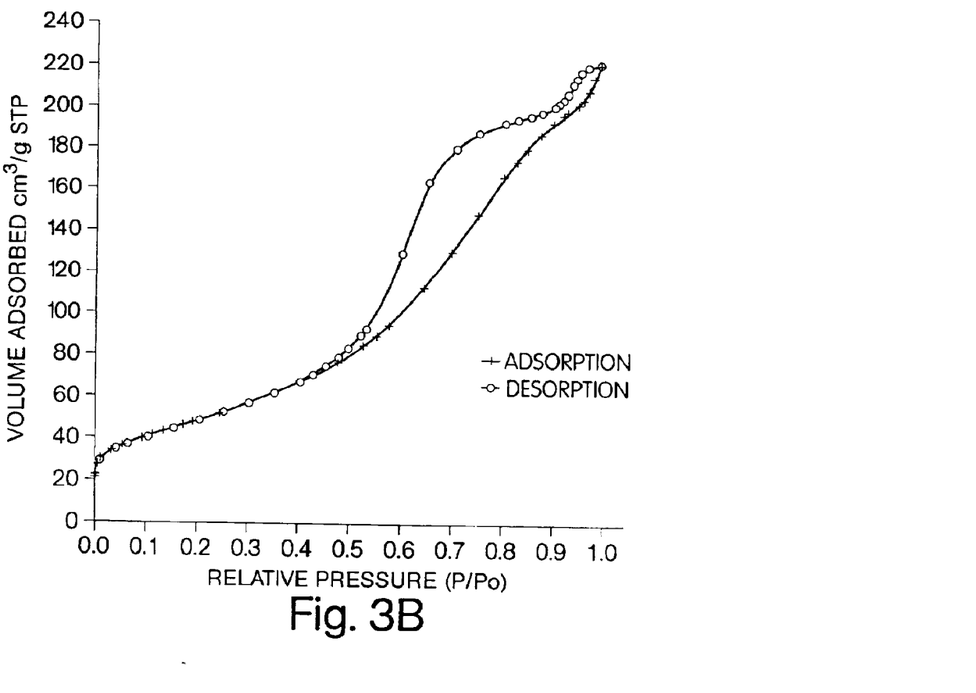
Figure 4:
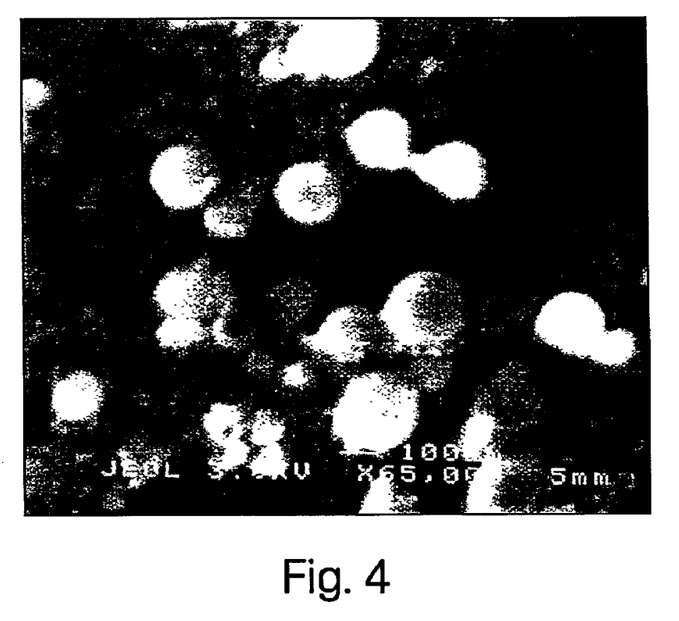
FIG. 4 shows an SEM of dried Ba—Al oxide particles having spherical shape and uniform particle size.

As-prepared gels were recovered by filtration. XRD analysis of these gels gave the diffraction pattern of an amorphous material. After drying at 120° C. for 24 h, nitrogen adsorption studies of these gels were performed. A typical isotherm is shown in FIG. 3(a) and the desorption pore size distribution is shown in FIG. 3(b). In general, the samples showed an adsorption/desorption isotherm characteristic of a mesoporous material at 77 K. The surface area of the preparations ranged from 200 to 650 $m^2/g$, while the pore diameter was in all cases uniform and around 4–10 nm. A significant hysteresis was observed between the adsorption and desorption isotherms. We attribute this behavior to inter-particle porosity, deriving from particle arrangement. This porosity may involve small pore openings with a larger void fraction in between particles, effectively creating an "ink-bottle" type pore. SEM studies of these dried gels showed spherical particles of uniform size as shown in FIG. 4.

EXAMPLE 3

Hydrolysis and Aging of the Alkoxide Precursors

The alkoxide solutions were added to the nanoemulsions at different rates, from 0.1 to 10 ml/min, and under various temperatures, from 25 to 80° C. The resulting gels were aged for different time lengths at a range of temperature and agitation conditions.

Figure 5:
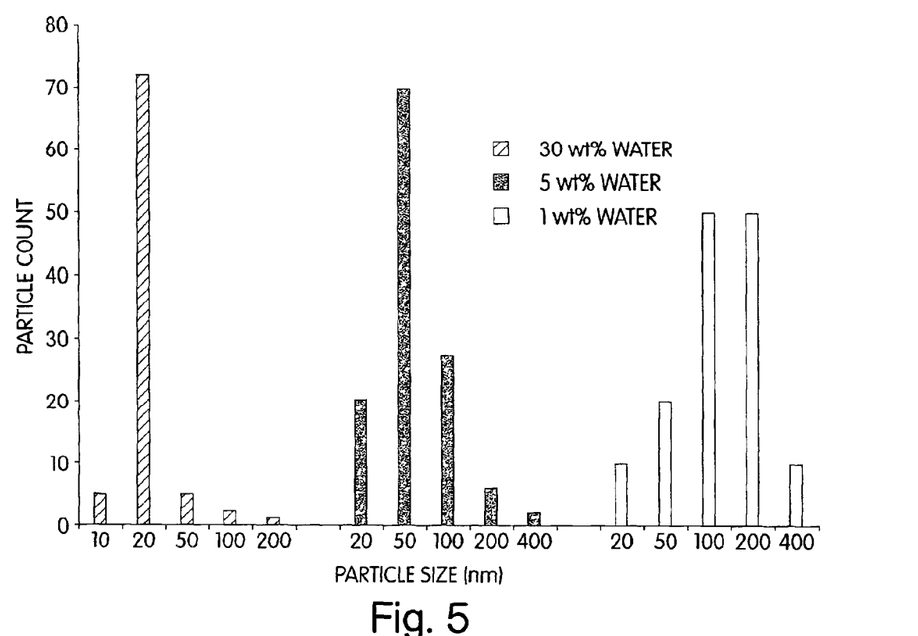
FIG. 5 shows a plot of the particle size and distribution as observed in TEM for emulsions of different water contents.

Effect of Water Content and pH in the Hydrolyzing Emulsion. The water content was found to affect the degree of agglomeration and the yield of materials per gram of emulsion. The high and medium water concentrations were found to give less agglomeration of the hydrolyzed materials and a more uniform particle size than the low-end values. FIG. 5 shows a plot of the particle size distribution as observed in TEM for different water contents. After aging for 8 h at room temperature, low water concentrations, below 5 wt %, were observed to yield agglomerated particles of 100–150 nm in diameter. When the water content in the emulsion was raised to 5 to 20 wt %, particles of 50–100 nm were obtained. Optimum water content was found to be between 5 and about 20 wt %. Water content higher than 25% sometimes yielded additional crystalline phases with a decrease in final surface area. While in general, optimum water content was between about 5 and 20 wt %, in some cases, for water contents from 30 wt % to 40 wt %, virtually no agglomeration was observed, while the particles obtained ranged in size from 10 to 50 nm. The average particle size for each preparation was obtained by measuring particle diameters in the transmission electron micrographs of the aged solutions.

DLS measurements of the initial emulsions showed that for all water contents the micellar size was below 5 nm and was monodisperse. Furthermore, we observed little variation of the micelle diameter with changing water content. However, the intensity of the signal of the particle size interval <5 nm increased with increasing water content, indicating that additional water added to the system forms new micelles rather than increasing the size of existing bodies. These results are consistent with the observations describing particle formation as a function of water concentration in the emulsion: at higher water content a larger number of micelles are available as hydrolysis nuclei, hence the nucleation rate is increased, leading to uniform, mono-dispersed spheres.

The values for the yield of final product as a function of water content were also investigated. We used emulsions with water contents of 1, 5, and 30 wt % corresponding to twice the stoichiometric value required to hydrolyze a solution containing 2.71 wt % of barium and aluminum isopropoxide in isopropanol. The results show a 100% conversion of the barium hexaaluminate precursors for the 5 and 30 wt % water content emulsions with yields of 0.11 and 0.68 g of barium hexaaluminate per 100 g of emulsion respectively, after aging for 8 h at room temperature. The 1 wt % water emulsion resulted in a conversion of only 67% under the same conditions, and the final yield was 0.015 g per 100 g of emulsion. Regular sol-gel processing yields 2.26 g of barium hexaaluminate per 100 g of water under the same stoichiometric conditions.

The effect of pH of the hydrolyzing media was also investigated. At pH of 7 and below, virtually no agglomeration was observed. At pH of 8 and above, immediate macroscopic particle formation and phase separation are observed after the precursor solution is added.

Effect of Aging Conditions. The best materials were obtained when the hydrolysis and aging processes were conducted at the lower temperature value. At temperatures above 40° C. significant particle growth was evident from macroscopic precipitation of large rod-shaped particles. When observed through SEM these particles showed evidence of heavy agglomeration of smaller spherical entities. The surface area after drying of the materials synthesized at 40 and 80° C. was no different from those prepared by regular sol-gel techniques.

Aging time was found to influence the final particle size obtained after recovery. We observed that particle size increased almost linearly with time for the first 24 h. The optimal aging time was determined to be about 24 h. After aging for periods longer than 24 h, the particles start becoming visible, as indicated by a change of the transparency of the emulsion. If stirring is stopped, a very fine dust-like suspension is observed. Aging emulsions were able to be kept in one phase for water contents as low as about 15 wt %. Aging times of 8 h or less produced materials with the highest surface area and lowest degree of agglomeration.

Figure 6:
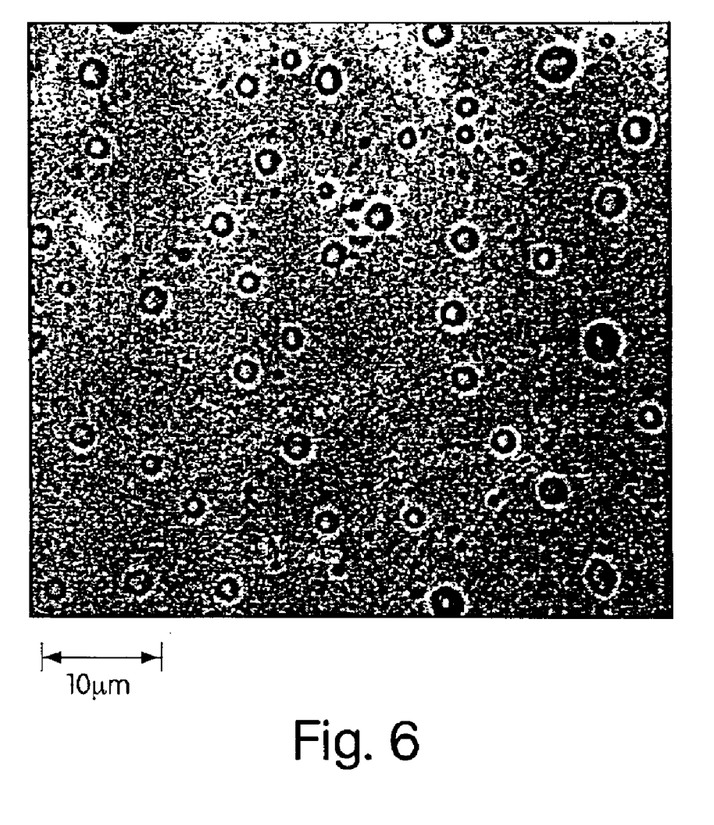
FIG. 6 shows an optical micrograph of microspheres aged for 72 h.

Through aging for extended periods of time, of up to 96 h, particles of uniform diameters in the micrometer range can be obtained. Samples prepared using low precursor concentrations, hydrolyzing emulsions containing 30 wt % water, and aged at room temperature for 72 and 96 hours yielded uniform spheres of 1.66 and 6.67 μm average diameter. These materials showed surface areas as high as 200 m$^2$/g after drying. FIG. 6 shows an optical micrograph of microspheres aged for 72 h.

In summary, we found that the following processing conditions give the best materials in terms of final surface area, thermal stability, degree of agglomeration, and particle size distribution: low precursor concentration of 1.35 wt %, water content of about 15–20 wt % in the hydrolyzing emulsions, water-to-precursor ratio of about 15 molar to about 100 molar, short aging time of 12–24 h and low aging temperature of 25° C.

EXAMPLE 4

Particle Recovery

The hydrolyzed and aged gels were recovered using two methods. In the first procedure, 2-propanol was added until a macroscopic two-phase separation of the emulsion was observed. The lighter phase contained the hydrocarbon organic phase, the alcohol cosurfactant, and a small amount of the main surfactant and 2-propanol; while the heavier phase contained the hydrolyzed gel, the remaining surfactant, water and 2-propanol. The lighter phase was decanted out. The heavier phase was dried and calcined according to section 2.2.5.

The second recovery method involved freezing the whole system rapidly by spraying it into a liquid nitrogen-cooled flask. The solidified solution was scraped from the flask and placed in a Virtis Co. Cascade Freeze Drier. The organic phase, water, cosurfactant and 2-propanol were selectively sublimed, leaving behind a gel consisting of mainly the surfactant and the hydrolyzed products, with a small content of water and 2-propanol. This gel was then treated according to Example 5.

EXAMPLE 5

Drying and Sintering

The recovered gels were re-suspended in dried 2-propanol. In one procedure, the mixture was refluxed in 2-propanol at 80° C. for 8 to 24 h. In a second approach, the gels were placed in a stirred beaker containing dried propanol and ultra-sonicated for a total of 2 h. Some preparations were centrifuged and re-suspended in fresh 2-propanol for a total of 4 times, for the purpose of eliminating most of the surfactant before drying. After re-suspension and washing, the particles were either oven dried at 120° C. for 24 h, supercritically-dried using nitrogen as the purging fluid, or freeze-dried. Remaining surfactant was removed by subsequently heating under nitrogen to 400° C. for 2 h and oxygen at 400° C. for 4 h. After surfactant removal, most systems were examined for high temperature stability by heating under oxygen at 5° C./min to 1300° C. and/or 1500° C. and held for 2 h to 8 h.

Effect of Recovery and Drying Techniques. Samples prepared using the optimal values obtained from the partial factorial experimental design were treated with different recovery and drying techniques. Samples treated by freeze drying, followed by re-suspension in 2-propanol and supercritical drying showed extraordinarily large surface area and narrow pore size distribution after calcination to temperatures as high as 1350° C. Pure barium hexaaluminate phases with surface areas exceeding 90 m$^2$/g were obtained using this technique. The average pore diameter of these samples was 40 nm. We believe that the drying processes are critical in preserving the particle and pore integrity. By using freeze drying we are able to remove the organic and polar solvents through sublimation, leaving the heavier surfactant behind. The surfactant is then exchanged using short-chain alcohols, which are further removed through supercritical drying. This last step prevents high capillary pressure within the particles during evaporation and highly exothermic reactions such as burning of the surfactants, preserving the particle and pore structure. Table 3 gives a summary of the observed surface area and crystalline phases present in different materials. Spherical particles are observed at temperatures as high as 500° C., after which sintering occurs giving way to agglomerated crystalline structures.

Recovery of particles through centrifugation was also evaluated. This technique was found to lead to agglomeration and disruption of the spherical particles, resulting in low surface areas, comparable to those obtained through regular sol-gel processing.

EXAMPLE 6

Characterization

X-ray diffraction (XRD) patterns of the samples after drying, surfactant removal, and calcination were taken on a Siemens D5000 θ-θ diffractometer with nickel-filtered Cu Kα radiation (1.5406 Å). Surface areas and average pore diameter of samples were determined in a nitrogen adsorption apparatus (Micromeritics ASAP 2000) using BET and BJH desorption methods respectively. Transmission electron microscopy (TEM) was performed on a JEOL 200 CX microscope operating at 200 kV. Surface morphology of the samples was observed through field-emission scanning electron microscopy using a JEOL 6840 FESEM.

The hydrolyzing emulsions were characterized for micelle size and morphology through dynamic laser light scattering (DLS) using a Brookhaven AT-9000 Correlator.

EXAMPLE 7

Control Particle Using a Sol-Gel Process

A control sample of barium hexaaluminate was synthesized through a conventional sol-gel process as described by Machida et al. (M. Machida, K. Eguchi, and H. Arai, Chem. Lett. (1987) p. 267) for comparison purposes. A surface area of 80 m$^2$/g was obtained after drying to 500° C., which dropped to 16 m$^2$/g after calcination at 1300° C. for 2 h. XRD analysis of this sample showed a pure barium hexaaluminate phase present after calcination.

EXAMPLE 8

Experimental Design

A partial factorial experimental design was performed to evaluate the relevant variables and their influence in the properties of the resulting materials. Table 2 shows the ranges through which the processing parameters were varied. These ranges were selected according to preliminary results obtained from regular sol-gel processing. The evaluated properties were surface area of the dried powders, and surface area and XRD phases after calcination to 1350 ad 1500° C.

EXAMPLE 9

Synthesis of Doped Barium Hexaaluminate

Prior to the preparation of the emulsion, 0.125 g of Cerium (III) Nitrate (Aldrich, 99%) were dissolved into 26.85 g of deionized water. The cerium nitrate solution was emulsified as described before. The final composition was:

| | |
|---|---|
| Cerium nitrate | 0.125 g |
| Deionized water | 26.85 g |
| Iso-octane | 152 g |
| Neodol 91-6 | 52 g |
| 1-Pentanol | 28 g |

20 ml of a solution of barium and aluminum isopropoxide containing 0.7 g of Ba per 100 ml of solution and 10.8 g of Al isopropoxide per 100 ml of solution, was further diluted with 20 ml of isooctane. The final solution was added at a rate of 1 ml/min to the emulsion described above. The reaction mixture was aged for 24 h at room temperature.

The resulting materials were recovered by freeze drying and calcined under air to 500 and 800° C. Analysis through XRD showed the cerium crystallized into cerium (IV) oxide with grain sizes of less than 5 nm at 500° C. and less than 7 nm at 800° C. The surface area of the preparation was 455 m$^2$/g at 500° C. and 220 m$^2$/g at 800° C.

The method described for cerium can also be used for Ni, La, Co, Fe, Mn.

EXAMPLE 10

Synthesis of Coated Barium Hexaaluminate

A reverse emulsion was synthesized as described in Example 1. The final composition of the emulsion was:

| | |
|---|---|
| Water: | 26.825 g |
| Iso-octane: | 152 g |
| Neodol 91-6: | 52 g |
| 1 Pentanol: | 28 g |

30 ml of a solution of barium and aluminum isopropoxide containing 0.7 g of Ba per 100 ml of solution and 10.8 g of Al isopropoxide per 100 ml of solution, was further diluted with 30 ml of isooctane. The final solution was added at a rate of 1 ml/min to the emulsion described above. The reaction mixture was aged for 18 h at room temperature.

After aging, 0.125 g of cerium (III) nitrate were added to the emulsion containing the hydrolyzed barium and aluminum precursors. The mixture was further aged for 6 h.

The materials were recovered by freeze drying and calcined under air to 500, 800 and 1100° C. After calcination, the materials were analyzed by XRD, nitrogen adsorption, and high-resolution transmission electron microscopy (HRTEM). XRD showed cerium crystals developed with a size of less than 4 nm at 500° C., less than 6.5 nm at 800°

Figure 7:
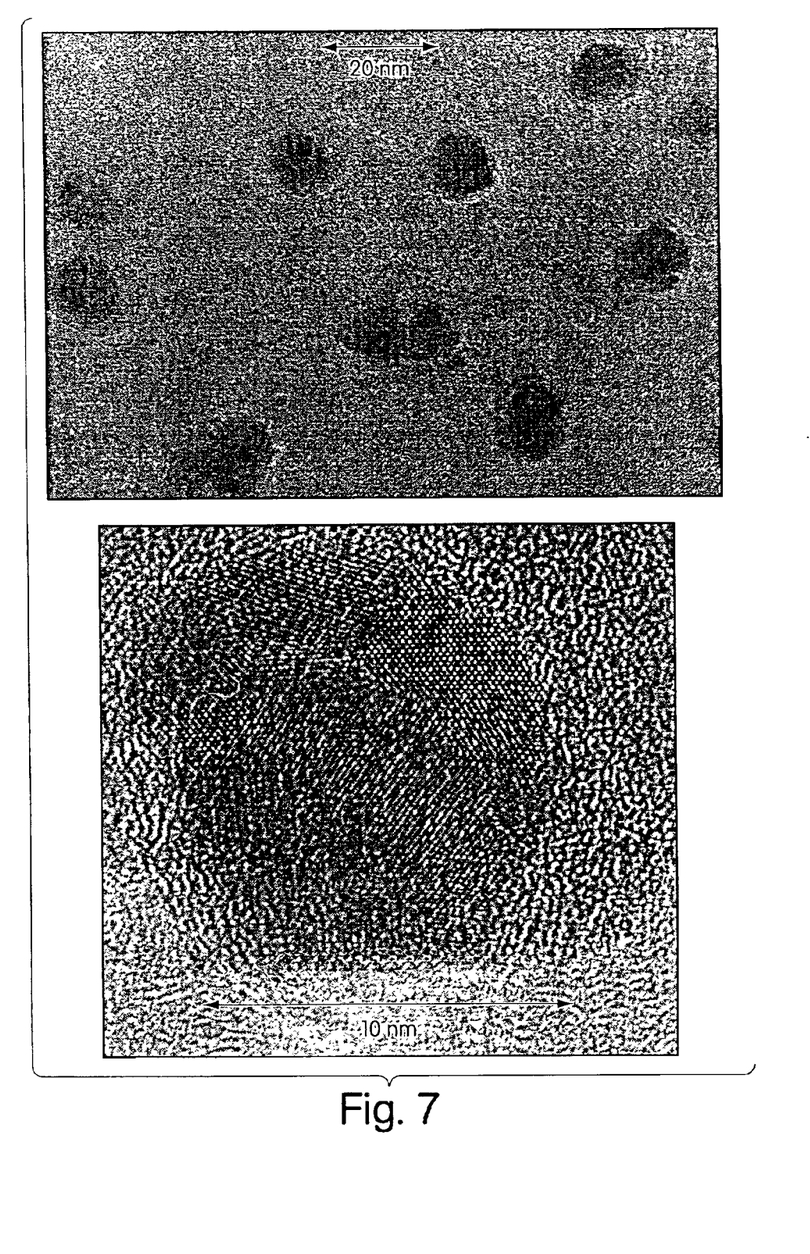
FIG. 7 shows the microstructure of Ce—BHA.

C., and less than 16 nm at 1100° C. No barium hexaaluminate phases were detected. Nitrogen adsorption showed a surface area of 409 m²/g at 500° C., 299 m²/g at 800° C., and 109 m²/g at 1100° C. HRTEM showed the barium hexaaluminate particles were coated with highly dispersed, uniform cerium oxide crystallites, which retained nanocrystalline morphologies beyond 1100° C. A microstructure of Ce—BHA is shown in FIG. 7.

EXAMPLE 11

Catalytic Oxidation of Methane with Pure BHA Materials

Figure 8:
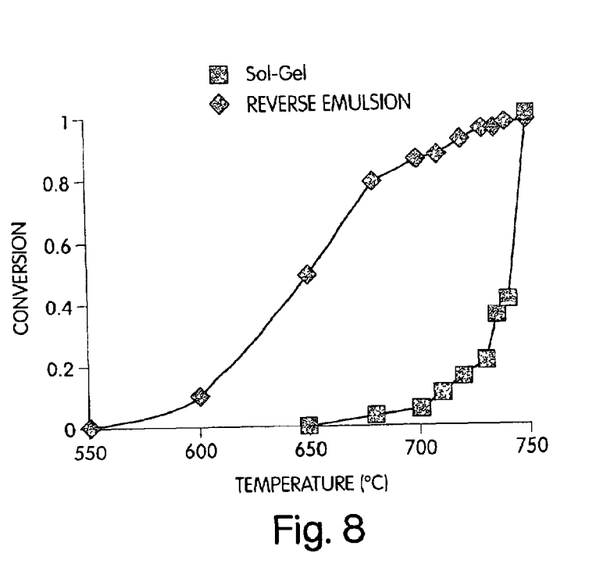
FIG. 8 shows a plot of temperature versus methane conversion for BHA.

A tubular, plug-flow reactor was used to determine the catalytic activity of BHA materials. 0.87 g of pure BHA having a surface area of 112 m²/g was introduced into a ¼" tubular quartz reactor. A mixture of 1% $CH_4$ in air was flowed at a space velocity of 60,000 $h^{-1}$ over the catalyst. The reactor was kept at constant temperature using a furnace. The conversion of $CH_4$ was measured by analyzing the exhaust stream using a gas chromatograph coupled to a mass spectrometer (GC/MS). 10% methane conversion was observed at 600° C., full conversion was achieved at 750° C. A plot of temperature versus methane conversion is shown in FIG. 8.

EXAMPLE 12

Catalytic Oxidation of Methane with Doped BHA Materials

Manganese doped-BHA was prepared as described in example 9 with a total loading of Manganese of 3 wt % by elemental analysis. The sample had a surface area of 75 m²/g after calcination to 1300° C. XRD analysis showed $Mn_3O_4$ diffraction peaks, in addition to the BHA peaks. The same procedure described in example 11 was used to probe the catalytic activity of the material. 10% conversion of methane was achieved at 520° C., full conversion was obtained by 650° C.

EXAMPLE 13

Catalytic Oxidation of Methane with Coated BHA Materials

Figure 9:
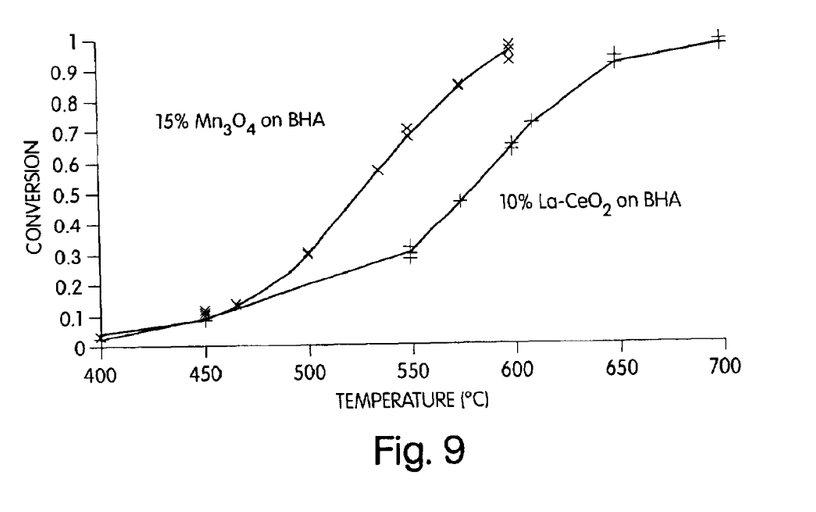
FIG. 9 shows a plot of temperature versus methane conversion for surface doped BHA systems.

Cerium-coated BHA was prepared as described in example 10 with a total loading of cerium of 10 wt % by elemental analysis. The sample had a surface area of 239 m²/g after calcination to 800° C. XRD analysis showed $CeO_2$ diffraction peaks only. The same procedure described in example 11 was used to probe the catalytic activity of the material. 10% conversion of methane was achieved at 430° C., full conversion was obtained by 600° C. A plot of temperature versus methane conversion is shown in FIG. 9.

TABLE 1

Formulation of microemulsions at different water contents.

| pH of the water phase | Water content (wt %) | Trimethyl-pentane content (wt %) | Surfactant content (wt %) | Co-surfactant content (wt %) |
|---|---|---|---|---|
| 7 | 1 | 96 | 2 | 1 |
| 7 | 5 | 89 | 4 | 2 |
| 7 | 10 | 75 | 11 | 4 |
| 7 | 30 | 47 | 17 | 6 |
| 7 | 40 | 42 | 13 | 5 |
| 2 | 5 | 87 | 6 | 2 |
| 4 | 5 | 87 | 6 | 2 |
| 10 | 5 | 85 | 7 | 3 |
| 12 | 5 | 85 | 7 | 3 |

TABLE 2

Partial factorial experimental design: investigated ranges for processing variables.

| | Ranges | | |
|---|---|---|---|
| Variable | Low | Medium | High |
| Precursor Concentration | 1.35 wt % | 2.71 wt % | 5.42 wt % |
| Water in emulsion | 1 wt % | 5 wt % | 30 wt % |
| Hydrolysis Temperature | 25° C. | 40° C. | 80° C. |
| Addition Rate | 0.1 ml/min | 1 ml/min | 10 ml/min |
| Aging Temperature | 25° C. | 40° C. | 80° C. |
| Aging Time | 8 h | 24 h | 48 h |

TABLE 3

Summary of materials obtained through different processing techniques

| | Particle | | Surface area (m²/g) after: | | | BaO.6 |
|---|---|---|---|---|---|---|
| Water in Emulsion | Recovery Method | Drying Method | Drying to 120° C. | Drying to 500° C. | Calcination to 1350° C. | $Al_2O_3$ XRD Phases |
| 5% | Precipitation | Conventional | 200 | Pending | 15 | Pure |
| 5% | Freeze | Conventional | 150 | Pending | 25 | Pure |
| 1% | Precipitation | Conventional | 50 | Pending | 8 | Pure |
| 5% | Precipitation | Supercritical | N/A | 350 | 56 | Pure |
| 1% | Precipitation | Supercritical | N/A | 288 | 47 | Pure |
| 5% | Freeze | Supercritical | N/A | 387 | 94 | Pure |

TABLE 3-continued

Summary of materials obtained through different processing techniques

| | Particle | | Surface area (m²/g) after: | | | BaO.6 |
|---|---|---|---|---|---|---|
| Water in Emulsion | Recovery Method | Drying Method | Drying to 120° C. | Drying to 500° C. | Calcination to 1350° C. | Al₂O₃ XRD Phases |
| 30% | Precipatation | Conventional | 298 | 215 | 38 | Mixed Al₂O₃ + BaO |
| 30% | Precipitation | Supercritical | N/A | N/A | 87 | Pure |
| 30% | Freeze | Supercritical | N/A | 287 | Pending | Pure |

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A composition comprising a material having an average particle size of less than about 100 nm wherein the material, when heated to 700° C. for at least about 10 min, retains an average surface area of at least about 100 m²/g, the material comprising barium hexaaluminate.

2. A composition as in claim 1, the material having an average particle size of less than about 50 nm wherein the material, when heated to 700° C., retains an average surface area of at least about 150 m²/g.

3. A composition as in claim 1, the material having an average particle size of less than about 25 nm wherein the material, when heated to 700° C., retains an average surface area of at least about 200 m²/g.

4. A composition as in claim 1, the material having an average particle size of less than about 10 nm wherein the material, when heated to 700° C., retains an average surface area of at least about 300 m²/g.

5. A composition as in claim 1, the material having an average particle size of less than about 5 nm wherein the material, when heated to 700° C., retains an average surface area of at least about 400 m²/g.

6. A composition as in claim 1, wherein the material retains an average surface area of at least about 300 m²/g at room temperature.

7. A composition as in claim 1, wherein the material, when heated to at least 900° C., retains an average surface area of at least about 100 m²/g.

8. A composition as in claim 1, wherein the material, when heated to at least 1100° C., retains an average surface area of at least about 20 m²/g.

9. A composition as in claim 1, wherein the material, when heated to at least 1300° C., retains an average surface area of at least about 20 m²/g.

10. A composition as in claim 1, wherein the material is immobilized on a surface of a monolith.

* * * * *